United States Patent [19]

Haley et al.

[11] Patent Number: 5,393,812
[45] Date of Patent: Feb. 28, 1995

[54] FLAME RETARDANT, LIGHT STABLE COMPOSITION

[75] Inventors: Charla S. Haley, Stone Mountain; William L. Sanchez, Conyers, both of Ga.

[73] Assignee: Hercules Incorporated, Wilmington, Del.

[21] Appl. No.: 114,575

[22] Filed: Aug. 31, 1993

[51] Int. Cl.$^6$ .................... C08K 5/5337; C08K 5/523; C08K 5/521
[52] U.S. Cl. ..................................... 524/91; 524/100; 524/142; 524/144
[58] Field of Search ................. 524/100, 91, 142, 144; 264/211; 8/490

[56] References Cited

U.S. PATENT DOCUMENTS

| | | | |
|---|---|---|---|
| 3,079,312 | 2/1963 | Alsys | 204/154 |
| 3,480,582 | 11/1969 | Brooks | 524/412 |
| 3,650,300 | 3/1972 | Listner | 524/100 |
| 3,691,275 | 9/1972 | Benghiat | 524/144 |
| 3,839,140 | 10/1974 | Tyler et al. | 161/115 |
| 3,883,481 | 5/1975 | Kopetz et al. | 524/412 |
| 3,912,792 | 10/1975 | Touval | 524/144 |
| 3,974,310 | 8/1976 | Mischutin | 427/390 |
| 4,046,719 | 9/1977 | Stanaback | 524/144 |
| 4,216,138 | 8/1980 | Bost et al. | 524/412 |
| 4,240,953 | 12/1980 | Albright | 524/144 |
| 4,340,513 | 7/1982 | Moteki et al. | 524/274 |
| 4,532,278 | 7/1985 | Hancock | 524/101 |
| 4,710,530 | 12/1987 | Green | 524/142 |
| 4,714,771 | 12/1987 | Liu | 524/102 |
| 4,774,044 | 9/1988 | Cline et al. | 524/371 |
| 4,957,953 | 9/1990 | Kikkawa et al. | 524/102 |
| 4,965,301 | 10/1990 | Leininger | 524/101 |
| 5,004,770 | 4/1991 | Cortolano et al. | 52/102 |
| 5,015,678 | 5/1991 | Seltzer et al. | 524/102 |
| 5,021,478 | 6/1991 | Ravichandran et al. | 524/102 |
| 5,021,481 | 6/1991 | Galbo et al. | 524/102 |
| 5,041,483 | 8/1991 | Burch . | |
| 5,096,950 | 3/1992 | Galbo et al. | 524/102 |
| 5,145,893 | 9/1992 | Galbo et al. | 524/102 |
| 5,189,086 | 2/1993 | Galbo | 524/102 |

FOREIGN PATENT DOCUMENTS

| | | |
|---|---|---|
| 0336668 | 10/1989 | European Pat. Off. . |
| 61-183332 | 8/1986 | Japan . |
| 1239166 | 9/1989 | Japan . |
| 3130414 | 6/1991 | Japan . |
| 3193793 | 8/1991 | Japan . |
| 2225018 | 5/1990 | United Kingdom . |

OTHER PUBLICATIONS

Gray, "A Novel Nonreactive HALS Boosts Polyolefin Stabilty", *Plastics Engineering, Jun. 1991.*
Green, "Brominated Phosphate Ester Flame Retardants for Engineering Thermoplastics", Chapter 17, *Fire and Polymers–Hazards Identification and Prevention*, ACS Symposium Series 425, Gordon R. Nelson, Editor, American Chemical Society, Washington D.C., 1990.
Gray, "UV Stabilization of Polypropylene Fiber", *Proceedings of Polypropylene Technology Conference*, Clemson University, Sep. 4–5, 1991.
"Kronitex® PB–370 Brominated Phosphate Flame Retardant", Sep. 1989, Technical sheet.
Material Safety Data Sheet 19186 97 1, "Kronitex (R) PB–370, Brominated Phosphate Ester", Revision 01, Effective Date Nov. 27, 1990, Printing Date Dec. 17, 1990.
"Kronitex® PB–460 Brominated Triaryl Phosphate, CAS No. 2788-11-6."
Material Safety Data Sheet F 16 50 2, "PB 460 Brominated Phosphate Flame Retardant", Revision 00, Effec- (List continued on next page.)

*Primary Examiner*—Veronica P. Hoke
*Attorney, Agent, or Firm*—Mark D. Kuller; Martin F. Sloan

[57] ABSTRACT

A flame retardant, light stable composition, prepared from a polyolefin, a halogenated hydrocarbyl phosphate or phosphonate ester flame retardant, and an alkoxyamine functional hindered amine light stabilizer. Suitable forms, in which the composition may be provided, include fibers, and fabrics prepared from such fibers.

68 Claims, No Drawings

OTHER PUBLICATIONS tive Date Oct. 22, 1992, Printing Date Nov. 23, 1992.
AATCC Test Method 16A–1990.

ASTM G23–90, Standard Practice for Operating Light-–Exposure Apparatus (Carbon–Arc Type) With and Without Water for Exposure of Nonmetallic Materials.

Test Method SAE J–1885, Surface Vehicle Recommended Practice, 1987–08.

FMVSS 302, Motor Vehicle Interiors, Federal Register, p. 70, vol. 36, No. 5, Friday, Jan. 8, 1971.

Ceric et al., "Action of Various Flame Retardant Combinations on the Flammability of Polypropylene", *Polymer Degradation and Stability*, vol. 33 (1991), pp. 307–323.

Green, "The Flame Retardation of Polyolefins", *Flame-Retardant Polymeric Materials*, vol. 3 (1982), pp. 1–37.

Lyons, "Synthetic Polymers with All–Carbon Backbones", Chapter 7, *The Chemistry and Uses of Fire Retardants*, Wiley–Interscience (1970), pp. 281–344.

Ghosh et al., "UV Stabilization of Flame Retardant Polypropylene Fiber", presented subsequently to the indicated Aug. 31, 1993 filing date of the present application, at the Polypropylene Technology Conference, held Sept. 1–2, 1993, in Clemson, S. C.

Mor, "Flame Retardant Polypropylene Stabilization and Discoloration Effect in Fiber", presented in the indicated Aug. 31, 1993 filing date of the present application, at the Polypropylene Technology Conference, held Sep. 1–2, 1993, in Clemson, S.C.

ASTM E 84–70, "Standard Method of Test for Surface Burning Characteristics of Building Materials", American Society for Testing and Materials.

NFPA No. 701, "Fire Tests–Flame Resistant Textiles, Films 1969" National Fire Protection Association.

FLAME RETARDANT, LIGHT STABLE COMPOSITION

BACKGROUND OF THE INVENTION

1. Field of the Invention

The present invention relates to flame retardant, light stable compositions—particularly fibers and textile structures—and to their preparation.

2. Description of Background and Other Information

Flame retardancy has become a major consideration, with respect to materials having industrial, commercial, and household applications. For example, polyolefins, including polyolefin plastics, can be highly flammable; accordingly, for products prepared from these substances—e.g., fibers and fabrics, used in products such as clothing, upholstery, and carpeting—the significance of flame retardancy is especially evident.

One means for imparting flame retardancy to polyolefins is by the incorporation of flame retardant additives; these are generally halogenated. Among the halogenated substances, found to have utility as flame retardants, are halogenated hydrocarbyl phosphate and phosphonate esters.

Such compounds appropriate for this purpose include those disclosed in Japanese Patent Publication No. 48-4374, published Feb. 7, 1973, in U.S. Pat. No. 4,714,771, and in Chapter 17, "Brominated Phosphate Ester Flame Retardants for Engineering Thermoplastics", Joseph GREEN, *Fire and Polymers—Hazards Identification and Prevention*, ACS Symposium- Series 425, Gordon R. Nelson, Editor, American Chemical Society, Washington, D.C., 1990. Reoflam® PB-370 and Reoflam® PB-460, from FMC Corporation, Philadelphia, Pa., are commercially available brominated hydrocarbyl phosphate ester flame retardants.

Resistance to degradation by UV light, or UV light stability, is also a desirable property for polyolefin products—including, as above, those prepared from fibers and fabrics of polyolefins. UV light stabilizers are correspondingly likewise incorporated with the polyolefins, to impart this property; suitable such substances include the hindered amine light stabilizers (known in the art as HALS).

To provide the properties of flame retardancy and light stability simultaneously, flame retardants and hindered amine light stabilizers have been employed together in polyolefin compositions. However, the halogenated flame retardants have been found to interfere with the function of hindered amine light stabilizers.

Where this interference occurs, the flame retardant forms acid bodies which react with the amine from the light stabilizer, destroying its ability to stabilize against UV radiation. Specifically, these acid bodies attack the active sites of the hindered amine, thereby robbing it of its stabilizing function.

Hindered amine light stabilizers which have been found to resist this deleterious interaction are the alkoxyamine functional hindered amine light stabilizers, these being identified as NOR HALS and as alkoxy-blocked HALS, in "A Novel Nonreactive HALS Boosts Polyolefin Stability", Robert GRAY, *Plastics Engineering*, June, 1991, and "UV Stabilization of Polypropylene Fiber", Robert GRAY, *Proceedings of Polypropylene Technology Conference*, Clemson University, Sep. 4–5, 1991. These publications disclose combinations of halogenated flame retardants and alkoxyamine functional hindered amine light stabilizers.

However, another disadvantageous phenomenon associated with halogenated flame retardants is their unfavorable effect upon the luster, or shine, of polyolefin products—particularly, fibers and fabrics. Even where halogenated flame retardants and alkoxyamine functional hindered amine light stabilizers, used together, are characterized by significant resistance to the degradation by UV light, delustering can still occur, because of the action of the flame retardant. This delustering prevents effective commercial utilization, because of the need to match fiber and fabric appearance, in color aesthetics.

It has been discovered that where the halogenated hydrocarbyl phosphate and phosphonate ester flame retardants are employed, in combination with a light stabilizer component including alkoxyamine functional hindered amine, not only is the requisite UV light stability achieved, but the delustering resulting from use of other flame retardants does not occur; this desirable combination of properties results, not only where light stabilization is provided by alkoxyamine functional hindered amine alone, but also where such alkoxyamine functional hindered amine is employed in conjunction with other hindered amine light stabilizers. This is of particular benefit, for polyolefin products which have flame retardancy, light stabilization, and color requirements.

SUMMARY OF THE INVENTION

The invention pertains to a composition comprising a polyolefin, a halogenated hydrocarbyl phosphate or phosphonate ester flame retardant, and a light stabilizer, comprising an alkoxyamine functional hindered amine. Preferred polyolefins include polypropylenes, mixtures of polypropylenes and polyethylenes, and ethylene-propylene copolymers.

Preferred flame retardants include halogenated aromatic phosphate or phosphonate esters, and halogenated aliphatic phosphate or phosphonate esters which have no hydrogenated carbon in a position alpha to a halogen bearing carbon. Particularly preferred such esters are tris(2,4-dibromophenyl) phosphate, tris(2,4-dichlorophenyl) phosphate, tris(2,4,6-tribromophenyl) phosphate, tris (3-bromo-2,2bis(bromomethyl)propyl) phosphate, tris(trichloroneopentyl)phosphate, tris(-chloro-dibromoneopentyl)phosphate, and tris(bromo-dichloroneopentyl)phosphate.

The light stabilizer may further comprise a nonalkoxyamine functional hindered amine. In such instance, the relative proportions, of the alkoxyamine functional hindered amine light stabilizer, and the nonalkoxyamine functional hindered amine light stabilizer, are such that, after exposure to 200 hours of carbon arc radiation, under the conditions set forth in Test Method AATCC 16A-1990 or ASTM G23-90, the composition has a tenacity retention of at least 50 percent; preferably, the weight ratio, of the alkoxyamine functional hindered amine to the nonalkoxyamine functional hindered amine, is from about 1:5 to about 5:1.

Among the preferred such nonalkoxyamine functional hindered amine light stabilizers are polymethyl propyl 3-oxy-[4(2,2,6,6-tetramethyl)piperidinyl] siloxane,

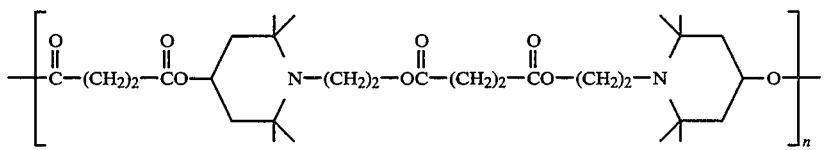

having a number average molecular weight ($M_n$) of at least about 2500,

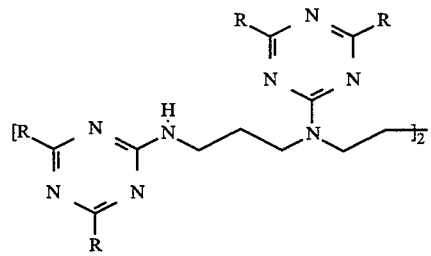

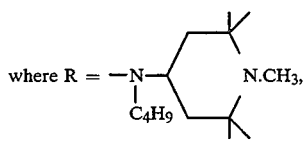

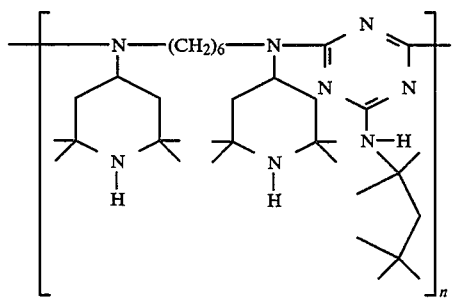

having a number average molecular weight ($M_n$) of at least about 2500, and

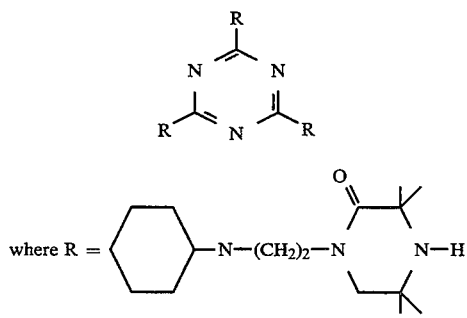

A preferred alkoxyamine functional hindered amine light stabilizer is that having the formula

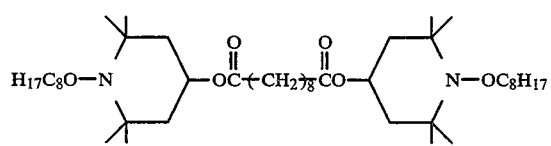

The composition of the invention may further comprise a UV light absorber. Suitable UV light absorbers include 2-3',5'-bis(1-methyl-1-phenylethyl)-2'-hydroxyphenyl) benzotriazole and 2,4-di-tert-butylphenyl 3,5-di-tert-butyl-4-hydroxybenzoate.

The halogenated hydrocarbyl phosphate or phosphonate ester flame retardant preferably comprises from about 0.5 to about 15 percent by weight of the composition, and the alkoxyamine functional hindered amine light stabilizer preferably comprises from about 0.01 to about 3 percent by weight of the composition. Where the UV light absorber is employed, it preferably comprises from about 0.01 to about 3 percent by weight of the composition.

The invention further pertains to the foregoing composition, in the form of fibers and textile structures. Preferred textile structures include the woven, nonwoven, tufted, and knitted fabrics.

The invention yet further pertains to a method of preparing a fiber comprising the foregoing polyolefin, flame retardant, light stabilizer, and, optionally, light absorber; preferably, the indicated amounts of these components are employed. In this method, a mixture of the polyolefin, flame retardant, and light stabilizer (and, optionally, light absorber) is extruded, to obtain a filament; this filament may be textured, or crimped and cut, to provide the fiber.

In the method of preparing the fiber, the components can be dry-mixed, prior to extrusion. Also, the filament obtained by extrusion can be drawn to a fineness of from about 2 to about 25 dpf, texturized in multifilament form to produce a bulked continuous filament (BCF) yarn, or crimped and cut to produce staple fibers.

Still additionally, the invention pertains to methods of preparing a textile structure, comprising a plurality of fibers made from the foregoing components. Such methods include the extrusion, drawing and texturizing of BCF yarns, and the crimping and cutting of staple fibers, as discussed above, to obtain a plurality of the fibers. The fibers are further processed, to form textile structures. For example, the staple fibers can be carded and needled or thermal bonded to obtain a nonwoven felt.

Also, the staple fibers can be carded and spun into yarns, using textile yarn manufacturing processes for short (cotton system) and long length (worsted or woolen system) staple fibers.

Textile spun yarns can then be converted to textile structures by processes of weaving, knitting, and/or tufting.

DESCRIPTION OF THE INVENTION

The compositions of the invention comprise at least one polyolefin, at least one flame retardant, and at least one light—particularly, UV light—stabilizer. Optionally, at least one UV light absorber may also be included, to provide further protection, in addition to that afforded by the light stabilizer, against the polyolefin degradation effected by UV light; in this regard, it is noted that the UV light absorbers and stabilizers serve the same purpose, but operate by different mechanisms.

Specifically, in acting upon the polyolefin, UV light causes degradation by generating free radicals in the polymer chains. The free radicals further attack the chains, breaking them into smaller pieces, and generating additional free radicals, which accelerate this degradation process.

The light stabilizer interfere with this process by reacting with the free radicals produced by the action of the UV light on the polymer chains. In this manner, the thusly generated free radicals are prevented from facilitating the degradation process.

In contrast, the UV light absorbers absorb the UV light and release heat. From such activity, the UV light is prevented even from generating the free radicals.

To serve their intended function, UV light absorbers must be positioned to interact with the UV light—i.e., to interrupt its path—before it can contact, and therefore act upon, the polyolefin which is to be protected; UV absorbers provide no benefit against the activity of already-generated free radicals. Accordingly, to be effective, UV absorbers must be close to the UV light receiving surface, of the composition in which they are incorporated—in the case of fibers, and textile structures prepared therefrom, at the fiber surface.

Because of the foregoing, UV light absorbers, by themselves, are not completely effective in such fibers and structures, against UV light degradation. The reason is that, with the blending of the materials—including polyolefin, and UV light absorber—used to make the fiber, and the subsequent extrusion, the UV absorber is correspondingly distributed throughout the fiber, with only a statistical portion in the required place, at the fiber surface.

The surface area of the fiber is relatively extensive, in comparison with its entire volume. To provide adequate protection against UV light degradation by UV light absorber alone, the amount of UV light absorber required would be excessive—by reason of its effect upon the fiber.

Regarding the former matter, so much UV light absorber would be required, as to prevent the fiber from being extruded. Accordingly, the UV light absorbers, though not suitable for use by themselves—for inhibiting UV light degradation, in compositions of the invention—can be used in combination with the UV light stabilizers, to enhance the stability imparted by these stabilizers, and to reduce the cost of the fiber.

The polyolefins of the invention include those which are suitable for flame retardant, light stable compositions. Among those polyolefins which may be used are homopolymers and copolymers; in this context, the copolymers are understood as including both those polymers incorporating two different monomeric units, as well as polymers incorporating three or more different monomeric units, e.g., terpolymers, etc.

Among the olefin monomers suitable, for the polyolefins of the invention, are propylene, ethylene, 1-butene, 2-butene, isobutylene, pentene, hexene, heptene, octene, 2-methylpropene-1, 3-methylbutene-1, 4-methylpentene-1, 4-methylhexene-1, 4-methylhexene-1, 5-methylhexene-1, bicyclo-(2,2,1)-2-heptene, butadiene, pentadiene, hexadiene, isoprene, 2,3-dimethylbutadiene-1,3,1-methylpentadiene-1,3,4-vinylcyclohexene, vinylcyclohexene, cyclopentadiene, styrene, and methylstyrene. As indicated, the polyolefins of the invention include the homopolymers, and copolymer combinations, of the foregoing olefin monomers, which are appropriate for flame retardant, light stable compositions.

Particular suitable polyolefins are those polypropylenes (PP), including the atactic, syndiotactic, and isotactic polypropylenes, and polyethylenes (PE), including the low density polyethylenes (LDPE), high density polyethylenes (HDPE), and linear low density polyethylenes (LLDPE), which are thusly suitable for such compositions. Further suitable polyolefins, among the copolymers, are those ethylenepropylene copolymers, including block copolymers of ethylene and propylene, and random copolymers of ethylene and propylene, which are likewise appropriate for flame retardant, light stable compositions.

A single polyolefin, or two or more polyolefins, may be employed, in whatever relative amounts are suitable for obtaining a product characterized by the properties desired for a particular purpose; one or more other polymers can be employed, together with the one or more polyolefins. Where multiple polymers, including the indicated one or more polyolefins, are thusly present, any suitable combinations of the polymers, such as multicomponent (e.g., bicomponent) and multiconstituent (e.g., biconstituent) configurations, may be employed. The types and proportions, of the polymers used, can be readily determined by those of ordinary skill in the art, without undue experimentation.

Where a single polyolefin is employed, polypropylenes are preferred homopolymers, and ethylene-propylene copolymers are preferred copolymers. A preferred mixture is that of one or more polypropylenes, and one or more polyethylenes.

Commercially available isotactic polypropylenes which may be used are Himont PH011, P165, and P128, from Himont U.S.A., Wilmington, Del., and Amoco 4 MFR and 9 MFR pellets, from Amoco Chemical Company, Chicago, Ill. These polymers have the properties as indicated below.

| Polymer | Type | Density[1] g/cm 3 | Melt[2] Flow dg/min | Melting Point Range (°C.) |
| --- | --- | --- | --- | --- |
| Himont PH011 | PP | .905 | 20 | 160–165 |
| Himont P165 | PP | .905 | 10 | 160–165 |
| Himont P128 | PP | .905 | 13 | 160–165 |
| Amoco 4 MFR | PP | .905 | 4 | 160–165 |
| Amoco 9 MFR | PP | .905 | 9 | 160–165 |

[1] ASTM D792
[2] ASTM 1238.230° C.

Suitable flame retardants of the invention include the halogenated phosphate and phosphonate esters—particularly, the halogenated hydrocarbyl phosphate and phosphonate esters; one or more of these flame retardants can be used, alone or in combination. The phosphate esters are preferred.

Preferably, halogenation is supplied by bromine, chlorine, iodine, or mixtures thereof. Of these, bromine is particularly preferred.

In this context, "hydrocarbyl" includes both "aromatic" and "aliphatic"—particularly, the hydrocarbyl groups are understood as including the alkyl groups and the aryl groups. Further, "hydrocarbyl" is understood as including both nonsubstituted hydrocarbyl groups, and substituted hydrocarbyl groups, with the latter referring to the hydrocarbyl portion bearing additional substituents, besides the carbon and hydrogen, and the indicated halogenation.

Halogenated hydrocarbyl phosphate and phosphonate esters having utility as flame retardants, in the compositions of the invention, include those as disclosed in Japanese Patent Publication No. 48-4374, published Feb. 7, 1973, in U.S. Pat. Nos. 3,912,792, 3,974,310, 4,710,530, and 4,714,771, and in Chapter 17, "Brominated Phosphate Ester Flame Retardants for Engineering Thermoplastics", Joseph GREEN, *Fire and Polymers—Hazards Identification and Prevention*, ACB Symposium Series 425, Gordon R. Nelson, Editor, American Chemical Society, Washington, D.C., 1990. These publications are incorporated herein in their entireties, by reference thereto.

Among the suitable halogenated aliphatic phosphate esters are the tris(haloneopentyl)phosphates, particularly the tris(trihaloneopentyl)phosphates, including tris(3-bromo-2,2 bis(bromomethyl)propyl) phosphate, tris(trichloroneopentyl) phosphate, tris(chlorodibromoneopentyl)phosphate, and tris(bromodichloroneopentyl)phosphate. Additional appropriate halogenated aliphatic phosphate esters are those of the formulae $$O=P-(OCH_2CHBrCH_2Br)_3$$
$$O=P-(OCH_2CH_2Br)_3$$

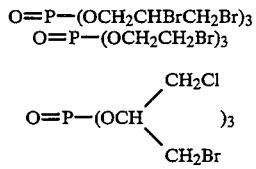

Halogenated aromatic phosphate esters which may be used include the polyhalopolyaryl phosphates, e.g., the tris(halophenyl) phosphates, including those disclosed in U.S. Pat. No. 3,912,792, and the polybromotriphenyl phosphates, including those disclosed in U.S. Pat. No. 4,710,530. The tris(tribromophenyl) phosphates are suitable; of these, tris(2,4,6-tribromophenyl) phosphate is preferred.

Additional appropriate specific halogenated aromatic phosphate esters are tris(2,4-dibromophenyl) phosphate and tris(2,4-dichlorophenyl) phosphate.

Specific suitable halogenated aliphatic phosphonate esters include those of the formulae

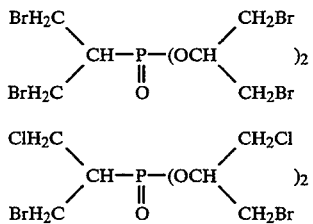

or their variants. In this regard, these phosphonates become partially converted to the phosphite esters, upon standing.

Of the halogenated hydrocarbyl phosphate and phosphonate esters, both the aromatic esters and the aliphatic esters will perform the flame retardant function. However, there are toxicity problems associated with certain forms of the halogenated phosphate and phosphonate aliphatic esters—particularly, the brominated phosphate and phosphonate esters.

Specifically, in such aliphatic esters where there is a hydrogen-bearing, or hydrogenated, carbon in the position alpha to—i.e., immediately adjacent to—a halogen bearing carbon, there will occur an elimination, generating a cancer causing agent. Accordingly, for applications where such toxicity is of concern, these aliphatic phosphate and phosphonate esters cannot be used.

Of the specific aliphatic phosphate and phosphonate esters identified above, the compounds characterized by this disadvantageous feature are those of the formulae

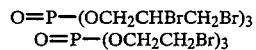
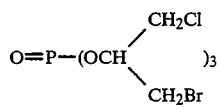
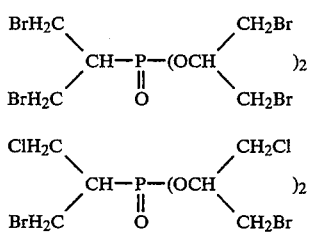

Accordingly, these compounds cannot be employed, where considerations of toxicity must be taken into account.

However, aliphatic esters with only nonhydrogenated carbons—i.e., carbons having no hydrogens bonded thereto—in positions alpha to halogen bearing carbons are not characterized by the indicated carcinogen-producing feature; accordingly, these compounds are not precluded from applications where such toxicity must be considered. Of the specific aliphatic phosphate and phosphonate esters identified above, tris(3-bromo-2,2 bis(bromomethyl)propyl)phosphate, tris(trichloroneopentyl)phosphate, tris(chlorodibromoneopentyl)phosphate, and tris(bromodichloroneopentyl)phosphate all lack a hydrogenated carbon alpha to a halogen bearing carbon, and so fall within this class.

Commercially available brominated hydrocarbyl phosphate esters which are suitable for the present invention, and which present no toxicity problems, include the earlier indicated Reoflam ® PB-370 and Reoflam ® PB-460.

Reoflam ® PB-370, including 3 percent by weight phosphorus and 70 percent by weight bromine, has the chemical composition and properties as set forth in the September, 1989 technical sheet entitled "KRONITEX ® PB-370 Brominated Phosphate Flame Retardant", and in Material Safety Data Sheet 19186 97 1, "Kronitex(R) PB-370, Brominated Phosphate Ester", Revision 01, Effective Date Nov. 27, 1990, Printing Date Dec. 17, 1990; these are incorporated herein in their entireties, by reference thereto. Reoflam ® PB-460, a brominated triaryl phosphate ester including 3.9 percent by weight phosphorus and 60 percent by weight aromatic bromine, has the chemical composition and properties as set forth in the September, 1989 technical sheet entitled "KRONITEX ® PB-460 Brominated Triaryl Phosphate, CAS No. 2788-11-6", and in Material Safety Data Sheet F 16 50 2, "PB 460, Brominated Phosphate Flame Retardant", Revision 00, Effective Date Oct. 22, 1992, Printing Date Nov. 23, 1992;

these are also incorporated herein in their entireties, by reference thereto.

Suitable light stabilizers of the invention include the hindered amine light stabilizers which are alkoxyamine functional hindered amine light stabilizers—i.e., identified as NOR HALS, including the succinate-based NOR HALS, and as alkoxy-blocked HALS, in the previously indicated publications "A Novel Nonreactive HALS Boosts Polyolefin Stability", Robert GRAY, *Plastics Engineering*, June, 1991, and "UV Stabilization of Polypropylene Fiber", Robert GRAY, *Proceedings of Polypropylene Technology Conference*, Clemson University, Sep. 4–5, 1991. These publications are incorporated herein in their entireties, by reference thereto.

One particular suitable such succinate-based stabilizer is that having the formula

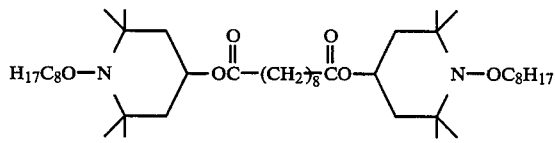

This stabilizer is commercially available as Tinuvin ® 123, from Ciba-Geigy Corporation, Hawthorne, N.Y.

The alkoxyamine functional hindered amine light stabilizers preferably have a molecular weight in the range of 200, or about 200, to 5,000, or about 5,000. Both the liquid state and the solid state alkoxyamine functional hindered amine light stabilizers are suitable for the present invention; those in the solid state are advantageous, in that liquid handling procedures and equipment are not necessary, where these solid state stabilizers are used for preparing the fibers and textile structures of the invention.

One suitable means for employing the liquid state stabilizers, for the present invention, is by initially forming a concentrate of the stabilizer, with the form of polyolefin used in the composition. This concentrate, which is in the solid state, is what is employed together with the polyolefin, flame retardant, and any other components employed.

The indicated Tinuvin ® 123 stabilizer of the invention is itself in the liquid state. However, it may be provided in the form of a concentrate, in the manner as set forth above.

A single alkoxyamine functional hindered amine, or two or more alkoxyamine functional hindered amines in combination, may be employed as the light stabilizer component. Alternatively, one or more alkoxyamine functional hindered amines may be used, in combination with one or more other—i.e., nonalkoxyamine functional—hindered amine light stabilizers.

Particularly, the light stabilizer component of the invention is that whose inclusion, in the compositions of the invention, provides a degree of resistance to degradation by UV light (i.e., a UV light stability) such that, after exposure to radiation, according to one of the standards as set forth below, the composition—especially, in the form of fiber, or textile structure—has a tenacity retention of at least 50%, or at least about 50%. More preferably, this tenacity retention is at least 75%, or at least about 75%; most preferably, at least 90%, or at least about 90%.

Regarding the immediately foregoing reference to standards for radiation treatment, one such applicable standard, for the level of exposure, is 200 hours of carbon arc radiation, under the conditions set forth either in AATCC Test Method 16A-1990, or in ASTM G23-90. Of these two test methods, AATCC Test Method 16A-1990 is preferred, although either is suitable, for this purpose; both test methods are incorporated herein in their entireties, by reference thereto.

As a more stringent standard, exposure may be to 639 kJ/$m^2$ of UV radiation, under the conditions set forth in Test Method SAE J-1885, 1987-08; this test method is also incorporated herein in its entirety, by reference thereto. This more stringent standard is particularly suitable for certain types of the textile structures, e.g., the nonwoven structures, such as the needled felts, especially those with automotive, marine, and related applications.

In any event, combinations of alkoxyamine functional hindered amine and nonalkoxyamine functional hindered amine, as well alkoxyamine functional hindered amine alone, which—whatever the standard of radiation exposure employed—meet the indicated level of tenacity retention, are within the scope of the invention. In such instances where more than one hindered amine is employed—whether multiple alkoxyamine functional hindered amines alone, or one or more alkoxyamine functional hindered amines in combination with one or more nonalkoxyamine functional hindered amines—the relative proportions of the different compounds to be used, for accomplishing the intended results of the invention, can be readily determined without undue experimentation, by those of ordinary skill in the art.

Particularly where both one or more alkoxyamine functional hindered amines, and one or more nonalkoxyamine functional hindered amines, are employed, the weight ratio, of alkoxyamine functional hindered amine to nonalkoxyamine functional hindered amine, preferably ranges from 1:5, or about 1:5, to 5:1, or about 5:1; more preferably, this weight ratio is between 1:3, or about 1:3, and 3:1, or about 3:1. As a matter of particular preference, the weight ratio, of alkoxyamine functional hindered amine to nonalkoxyamine functional hindered amine, is from 1:2, or about 1:2, to 2:1, or about 2:1.

The nonalkoxyamine functional hindered amine light stabilizers which may be used are those which, in conjunction with alkoxyamine functional hindered amine, will provide the indicated results.

One such hindered amine light stabilizer is that of the formula

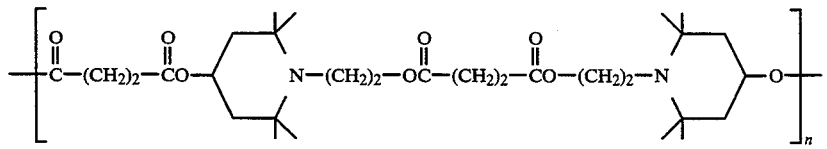

having a number average molecular weight ($M_n$) of at least about 2500. This stabilizer is commercially available as Tinuvin 622, from Ciba-Geigy Corporation.

Another is that of the formula

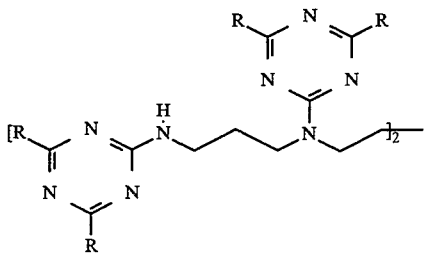

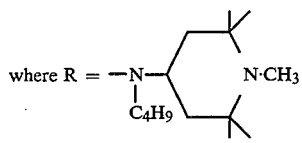

This stabilizer is commercially available as Chimassorb ™ 119, from Ciba-Geigy Corporation.

Yet another is that of the formula

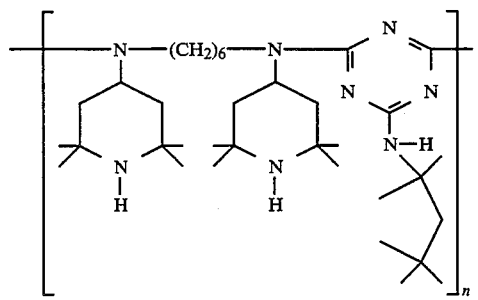

having a number average molecular weight ($M_n$) of at least about 2500. This stabilizer is commercially available as Chimassorb ™ 944, from Ciba-Geigy Corporation.

Still another is that of the formula

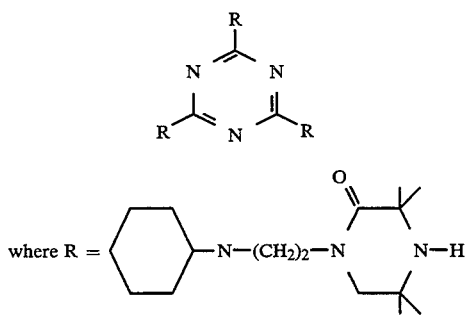

This stabilizer is commercially available as Good-Rite ™ 3150, from the B. F. Goodrich Company, Brecksville, Ohio.

Still another is polymethyl propyl 3-oxy-[4(2,2,6,6-tetramethyl)piperidinyl] siloxane. This stabilizer is commercially available as Uvasil 299-LM, from EniChem Synthesis SpA, Milano, Italy.

The suitable UV light absorbers include such components which serve the intended purpose of UV light absorption, and are compatible with the compositions of the invention, without interfering with their intended properties and functions. The benzotriazole and hydroxybenzoate light absorbers are examples of those which can be employed; among these are 2-3',5'-bis(1-methyl-1-phenylethyl)-2'-hydroxyphenyl) benzotriazole, which is commercially available as Tinuvin ® 234, from Ciba-Geigy Corporation, and 2,4-di-tert-butylphenyl 3,5-di-tert-butyl-4-hydroxybenzoate, which is commercially available as UV-CHEK ® AM-340, from Ferro Corporation, Bedford, Ohio.

In the compositions of the invention, the polyolefin is preferably present in an amount of at least about 85 or 86 percent by weight of the composition. Generally, the polyolefin comprises about 90 to 95 percent by weight, or more, of the composition.

The halogenated hydrocarbyl phosphate ester flame retardant is preferably present in an amount of between 0.5 percent, or about 0.5 percent, and 15 percent, or about 15 percent, by weight of the composition; more preferably, in an amount of between 0.5 percent, or about 0.5 percent, and 10 percent, or about 10 percent, by weight of the composition. Still more preferably, the halogenated hydrocarbyl phosphate ester is present in an amount of from 1 percent, or about 1 percent, to 5 percent, or about 5 percent, by weight of the composition; a particularly preferred range is between 2 percent, or about 2 percent, and 5 percent, or about 5 percent, by weight of the composition.

The amount of UV light stabilizer—whether alkoxyamine functional hindered amine alone, or in combination with other stabilizer, such as one or more of those discussed above—is preferably from 0.01 percent, or about 0.01 percent, to 3 percent, or about 3 percent, by weight of the composition. A more preferred range is between 0.2 percent, or about 0.2 percent, and 1 percent, or about 1 percent, by weight of the composition.

Where UV light absorber is employed, the preferred amount is from 0.01 percent, or about 0.01 percent, to 3 percent, or about 3 percent, by weight of the composition. More preferably, the amount of UV light absorber is between 0.3 percent, or about 0.3 percent, and 2 percent, or about 2 percent, by weight of the composition; as a matter of particular preference, the UV light absorber is present in an amount of between 1 percent, or about 1 percent, and 2 percent, or about 2 percent, by weight of the composition.

Conventional additives, in conventional amounts, can also be included, in the compositions—of the invention.

Suitable such additives include coloring agents, such as dyes and pigments. Examples of colorants which may be employed include white (Anatase $TiO_2$) pigment dispersion, commercially available as 41424 PEMB, from AMPACET Corporation, Tarrytown, N.Y., yellow pigment dispersion, commercially available as SCC 4200, from Standridge Color Corporation, Social Circle, Ga., yellow pigment dispersion, commercially available as Yellow 3172, also commercially available from Standridge Color Corporation, red pigment dispersion, commercially available as Quinacridone Red 267543, from Color Formulators, Inc., Fairfield, N.J., red pigment dispersion, commercially available as Red PP134, from Indol Color Co., Newark, N.J., and black pigment dispersion, commercially available as 3115 Black Fiber PCC, from Southwest Chemical Services Incorporated, Seabrook, Tex.

Other appropriate additives are stabilizers—e.g., melt stabilizers—pro-degradants, antistats, and extrusion aids. A pro-degradant which may be employed is dialkyl peroxide, a commercially available example of which is Lupersol 101, from Pennwalt Corporation, Buffalo, N.Y.; a suitable antistat is polyoxyethanol, a commercially available example of which is Dacospin HS, from Henkel Corporation, Ambler, Pa.

A suitable commercially available melt stabilizer is Ultranox ® 626, from GE Specialty Chemicals, Parkersburg, W. Va. A suitable extrusion aid is calcium lactate, commercially available is Pationic ® 1230, from American Ingredients Company, Kansas City, Mo.

Appropriate finishes may be employed for coating the fibers of the invention, e.g., during preparation of the fibers. A suitable commercially available finish is Emerlube 7485B, from Henkel Corporation—Emery Group, Cincinnati, Ohio, this finish being a mixture of an ethoxylated fatty acid ester and amide.

Regarding the flame retardancy of compositions of the invention, one suitable test for measuring this property—particularly, with respect to the fibers, and the textile structures prepared therefrom—is test FMVSS 302, Motor Vehicle Interiors, Federal Register, page 70, Vol. 36, No. 5— Friday, Jan. 8, 1971. This test method is incorporated herein in its entirety, by reference thereto.

For this FMVSS 302, Motor Vehicle Interiors test, a burn rate of less than or equal to 1.5 inches/minute, or about 1.5 inches/minute, is considered to be acceptable, for the compositions of the invention. However, it is preferable that the compositions of the invention be self-extinguishing, within the meaning of this test.

Another suitable test, for measuring the flame retardancy of the compositions of the invention, is the Vertical Burn Test. This test involves suspending a test specimen over a flame, and measuring the resulting char length, after flame, and drip burn.

Specifically, for the Vertical Burn Test, two 2¾ inch by 10 inch specimens, of the material to be tested, are cut, with their long dimension in the direction of the warp. Each of these specimens is subjected to the testing procedure.

In this procedure, the specimen is placed inside a metal frame, covering both sides of the material. Specifically, the specimen is placed in a metal holder clamping each long edge of the fabric, leaving the ends free, and exposing a strip 2 inches wide, by 10 inches long.

The thusly framed material is placed in a test cabinet. The holder and specimen are supported in a vertical position—within a shield which is 12 inches wide, 12 inches deep, and 30 inches high, and has a glass observation window—In this position, the lower end of the specimen is suspended ¾ inch above the top of a Bunsen-type gas burner, used for lighting the specimen. Provision is made for moving the gas burner into position, after the shield is closed.

The burner includes a tube having a ⅜ inch inside diameter, and with the air supply completely shut off, adjusted to give a luminous flame 1½ inches long; accordingly, when the burner is lighted, the bottom edge of the test specimen hangs ¾ of an inch into flame. The burner is supported in a fixed position, with the barrel of the burner at an angle of 25 degrees from the vertical.

The flame is applied vertically, for 12 seconds, near the middle of the width of the lower end of the specimen. The flame is then withdrawn, and the duration of flaming on the specimen is noted.

As indicated, this test measures the properties of after burn, drip burn, and char length.

After burn is the length of time, in seconds, that the specimen continues to burn, after the burner has been pulled away from the base of the specimen.

Drip burn is the length of time, also in seconds, that any product continues to burn, once it has dripped from the specimen, and landed on the floor of the shield.

Char length is the length of material destruction, and is normally measured from the bottom of the sample, to a horizontal line, above which all material is sound and in its original condition—i.e., unaffected by the flame. Char length is determined immediately, after all flaming and afterglow on the specimen has ceased.

Materials tested under the Vertical Burn Test are graded by "pass/fail" criteria. For fabrics in the following weight categories, results which are at or below the following levels are considered to be passing.

| Fabric Weight (ounces/sq. yd.) | After Flame (sec)[1] | Drip Burn (sec)[1] | Char Lengths | |
| --- | --- | --- | --- | --- |
| | | | (inch)[2] | (inch)[2] |
| Over 10 | 2.0 | 0 | 3.5 | 4.5 |
| Over 6 to 10 | 2.0 | 0 | 4.5 | 5.5 |
| 6 and Under | 2.0 | 0 | 5.5 | 6.5 |

[1] Maximum for an individual specimen
[2] Maximum for the average of two specimens Resistance to degradation by UV light (i.e., UV light stability) may—consistent with the previous discussion herein, concerning the light stabilizers of the invention—be determined by measuring percent tenacity retention, after exposure to 200 hours of carbon arc radiation, under the conditions set forth in AATCC Test Method 16A-1990 or in ASTM G23-90, or exposure to 639 kJ/$m^2$ of UV radiation, under the conditions set forth in Test Method SAE J-1885, 1987-08. For the purposes as set forth herein—also consistent with the indicated previous discussion—a tenacity retention of 50 percent or better is considered to be passing, i.e., acceptable degradation resistance; like the foregoing flame retardancy tests, these test methods are particularly suited for the fibers and textile structures of the invention.

As to their UV light degradation resistance, in terms of the above-indicated test, the compositions of the invention preferably have a tenacity retention of at least 50 percent, or at least about 50 percent. Their tenacity retention is, more preferably, at least 75 percent, or at least about 75 percent, and, most preferably, at least 90 percent, or at least about 90 percent.

Another property pertinent to compositions of the invention—yet again, particularly to the fibers and textile structures—is luster. The luster, e.g., of a fiber, is understood as being the shine or glitter in its appearance; in this context, silk is lustrous, and cotton is not.

One means of measuring a fiber's luster is by the difference in the color shade, when the fiber is viewed from angles 90° apart. What is involved is the mechanism by which the eye perceives color.

Specifically, the eye divides color into three components—red/green, yellow/blue, and light/dark; there are three types of receptors in the back of the eye, one for each of these components. The light/dark component occupies the z axis, in three dimensional space, and is also identified as the lightness, or L value.

In using these factors for measuring luster, fibers are wound on a card—and, accordingly, lined up side by side. The fibers are viewed in two directions: along their axes (i.e., proceeding along their length, in the direction from their beginnings to ends); and in the perpendicular direction (i.e., proceeding from side to side, in the direction 90° to the initially indicated direction of viewing).

Each of these views provides an L value. Luster is the difference in the two L values, or delta L (ΔL).

In this regard, ΔL, and therefore luster, will be the difference of shade, in the color perceived from these two views. The more distinction there is between the two shades—i.e., the lighter one shade is, in comparison to the other—the greater the luster (the higher the ΔL value); conversely, if the shade of color is the same from both views, then the fiber is dull, with no luster (ΔL=0).

Consistent with earlier discussion herein on this point, a significant aspect of the property of luster, with respect to the invention, is that—in contrast to prior art compositions, employing other flame retardants—the presence of brominated hydrocarbyl phosphate ester flame retardants does not deluster the compositions of the invention. Specifically, in prior art compositions, the presence of such other flame retardants removes all, or substantially all, of the luster which would otherwise be present, if the flame retardants were not.

However, in the compositions of the invention, inclusion of the halogenated hydrocarbyl flame retardants generally results in minimal surface luster loss—at most, the degree by which luster is decreased is not sufficient to effect the delustering which occurs with other flame retardants, in prior art compositions. The luster maintenance characterizing the compositions of the invention is demonstrated in the Examples which subsequently follow.

The compositions of the invention can be provided in any suitable form, such as fibers, coatings, films, textile structures (i.e., fabrics) and the like, in accordance with their intended function; in this regard, fibers are understood as encompassing both cut and uncut fibers and filaments, including continuous filaments.

Further in this regard, textile structures are understood as encompassing all manner of fabrics, including woven, nonwoven, knitted, and tufted fabrics. As repeatedly noted herein, preferred forms are the fibers and textile structures prepared from the fibers—particularly with respect to the earlier discussed component weight proportion ranges, and values concerning flame retardancy, UV light stability, and luster.

The compositions of the invention—particularly, the fibers, and the textile structures made therefrom—may be prepared by conventional techniques, with the use of conventional equipment. Specifically with respect to the fibers and textile structures, standard means for effecting extrusion, and subsequent processing, may be employed.

As one appropriate method, the polyolefin, halogenated hydrocarbyl phosphate or phosphonate ester flame retardant, and alkoxyamine functional hindered amine light stabilizer, and any additional components which may be included—e.g., UV light absorber, further additives—may be mechanically blended, such as by dry mixing, before being fed to the extruder. Alternatively, they can simply be fed to the extruder, without such prior blending.

In the extruder, the components are subjected to blending, melting, and heating, then extruded therefrom, in the form of filaments. Such extrusion, with the subsequent processing, may be effected by short spin or long spin, as well as using one step or two step procedures; in this regard, it is understood that the terms "short spin", "long spin", "one step", and "two step" are all used herein, in accordance with their commonly understood meanings in the art, and that, pursuant to such usage, each of the short spin and long spin may be conducted in either one or two steps.

Consistent with the foregoing, where long spin is employed, filaments from the spinnerette of the extruder fall through a comparatively extensive chimney, before being taken up; in this chimney, cooling is effected by passage of air over the filaments. For short spin, there is less distance between spinnerette and takeup, because the means employed for effecting cooling, by passage of air, do not require as much space, to obtain the desired result, as is necessary for long spin.

In the two step process, extrusion and the subsequent processing (i.e., drawing, and whatever further optional treatment may be employed, such as crimping, and/or cutting to obtain staple fiber; or texturing to obtain a bulked continuous filament (BCF) fiber) are conducted as separate steps. Specifically, the cooled filaments are wound, on a bobbin, in the undrawn state, and then subjected to the indicated processing.

By contrast, in the one step process, extrusion and processing are effected in a continuous operation. The cooled fibers are collected on a moving cylinder, then immediately subjected to drawing, and subsequently to any of the indicated additional optional treatment.

As previously noted, both long spin and short spin may each be utilized, for either of the one step or two step processes. However, as a matter of preference, for cut staple fiber, long spin is employed in conjunction with the two step process, and short spin, with the one step process. For continuous filament (CF) or (BCF) fibers, long spin is used in both one step and two step processes.

Filaments and fibers of the invention may be drawn or undrawn, continuous or cut (i.e., staple), texturized or untexturized (e.g., crimped or uncrimped), colored, or uncolored; with reference to terms commonly understood in the art, the continuous filaments may be provided, e.g., in the form of partly oriented yarn (POY), fully oriented yarn (FOY), continuous filament (CF), and bulked continuous filament (BCF), with conventional techniques being suitable for obtaining these forms. Further, filaments and fibers of the invention may be drawn to whatever fineness is appropriate for the intended purpose; preferably, drawing is effected to provide a fiber size in the range of from 2, or about 2, to 25, or about 25, denier per filament (dpf).

Correspondingly, filaments and fibers of the invention may be combined into bundles having whatever total yarn denier is appropriate for the intended purpose. In a preferred embodiment, they are combined into bundles having a total yarn denier of 50, or about 50, to 30,000, or about 30,000.

Staple fibers of the invention may be used to prepare textile structures, likewise of the invention. In this regard, such fibers can be made into webs, preferably by carding; further, any of the other known commercial processes, including those employing mechanical, electrical, pneumatic, or hydrodynamic means for assembling fibers into a web—e.g., airlaying, carding/hydroentangling, wetlaying, hydroentangling, and spunbonding (i.e., meltspinning of the fibers directly into fibrous webs, by a spunbonding process)—can also be appropriate for this purpose. The thusly carded fiber may appropriately needled, into nonwoven felt fabric.

Staple fibers of the invention may also be carded and spun into yarns, using a cotton, worsted, or woolen system yarn manufacturing process. These spun yarns and the CF and BCF fibers of the invention can be converted to textile structures, likewise of the invention. In this regard, such fibers can be made into fabrics by the commercially known processes of tufting, knitting, and weaving.

Fibers and textile structures of the invention are suitable for a variety of uses—including, but not limited, to upholstery, carpets, window furnishings (e.g., draperies, casings, linings, blinds), wall coverings, panel cloths, automotive, aircraft, and truck interior furnishings (e.g., trim fabrics, upholstery, load floors and carpet), and marine and recreational vehicle fabrics.

The invention is illustrated by the following Examples, which are provided for the purpose of representation, and are not to be construed as limiting the scope of the invention. Unless stated otherwise, all percentages, parts, etc. are by weight.

PREPARATION AND TESTING OF YARNS AND FIBERS IN EXAMPLES

For each of the formulations in the subsequent Examples 1–5, dry mixing was effected, by tumble mixing blends including the proportions of polypropylene, halogenated hydrocarbyl phosphate ester flame retardant, hindered amine light stabilizer, and (in specified formulations) UV light absorber as set forth therein, as well as the following amounts of further components:

| | |
|---|---|
| Lupersol 101 pro-degradant | 0.0040 wt. % |
| Dacospin HS antistat | 0.0250 wt. % |
| 41424 white (Anatase TiO$_2$) pigment dispersion | 0.10 wt. % |
| SCC 4200 yellow pigment dispersion | 0.15 wt. % |
| Quinacridone Red 267543 red pigment dispersion | 0.11 wt. % |
| 3115 Black Fiber PPC black pigment dispersion | 0.16 wt. % |
| Ultranox ® 626 melt stabilizer | 0.10 wt. % |
| Pationic ® 1230 extrusion aid and antacid | 0.10 wt. % |

The resulting powder mixture was gravity fed into an extruder. At the feed throat of the extruder, the mixture was blanketed with nitrogen, before entering the extruder; therein, the mixture was heated to a melt, extruded, and spun into a delta cross section fiber, at a melt temperature of about 240° to 250° C.

In Examples 1–4, the melt was extruded through a standard 40 hole spinnerette, at a rate of 888 meters per minute, to prepare spin yarn of 42 decitex (dtex), 38 denier per filament (dpf). The fiber threadlines in the quench box were exposed to normal ambient air quench (cross blow).

After quenching, the fibers were coated with 1.0 to 2.0 weight percent Emerlube 7485 finish mixture.

The resulting continuous filament yarn was drawn down to 10 dpf, using a mechanical draw ration of 3.8x.

In Example 5, the melt was extruded through a 700 hole spinnerette, at a rate of 300 meters per minute, to prepare spin yarn of 8.25 decitex (dtex), 7.5 denier per filament (dpf). The fiber threadlines in the quench box were exposed to normal ambient air quench (cross blow).

After quenching, the fibers were coated with 1.0 to 2.0 weight percent Emerlube 7485 finish mixture.

The resulting continuous filament yarn was drawn down to 2.5 dpf, using a mechanical draw ration of 3.0x.

For Examples 1–5, a small portion of the drawn yarn was set aside, for measuring light stability and luster. The remaining yarn was collected in a tow, and crimped at about 20 crimps per inch (79 crimps per 10 cm), using a stufferbox; the crimped tow was cut into sections 76 mm long, using a metal die and a hydraulic press.

The thusly cut fibers were carded into a web, using commercially available lab-sized equipment. This web was further needled into a flat nonwoven felt fabric, in the weight range of 6 to 10 oz./yd.$^2$, using commercially available equipment from Oskar Dilo Maschinenfabrik, Eberbach, Germany.

For the formulations of Example 6, the blends included polypropylene, halogenated hydrocarbyl phosphate ester flame retardant, and hindered amine light stabilizer, but no UV light absorber. The identities and amounts, of the further components, were as follows:

| | |
|---|---|
| Lupersol 101 pro-degradant | 0.2 wt. % |
| Dacospin HS antistat | 0.85 wt. % |
| 41424 white (Anatase TiO$_2$) pigment dispersion | 0.8 wt. % |
| Yellow 3172 30 percent yellow 5687 | 0.29 wt. % |
| Red PP 134 50 percent red BRN | 0.07 wt. % |
| 3115 Black Fiber PPC black pigment dispersion | 0.10 wt. % |
| Ultranox ® 626 melt stabilizer | 0.2 wt. % |
| Pationic ® 1230 extrusion aid and antacid | 0.2 wt. % |

The processing steps previously set forth, for Examples 1–5, were likewise employed for Example 6, with the following differences.

With respect to the extrusion phase, a melt temperature of 220° to 230° C. was employed. Further, the melt was spun into a round cross section fiber.

The melt was extruded through a standard 110 hole spinnerette, at a rate of 477 meters per minute, to prepare a spin yarn of 22 decitex (20 dpf).

As to the Emerlube 7485-coated fibers, these were wound on a package. The continuous filament yarn was drawn to a 6.7 dtex (6 dpf).

The web obtained from carding was multi-layered. The weight range, of the flat felt into which the web was needled, was 10 to 12 oz./yd.$^2$.

For testing flame retardancy, samples were cut from the needled felts. Both test method FMVSS 302, Motor Vehicle Interiors, and the Vertical Burn Test, were employed for the fabrics of Examples 1–5; with the Example 6 materials, only the Vertical Burn Test was used.

As indicated, the drawn continuous filament fiber was used to test light stability and luster. In preparing test samples, this yarn was wound around 63.5 cm × 63.5 cm (2.5 inch × 2.5 inch) cardboard cards.

The samples for testing tenacity retention were exposed to 639 kJ/m$^2$ of UV radiation, under the conditions set forth in test method SAE J-1885, 1987-08. The thusly exposed filaments were then cut from the card, and tested for percent tenacity retention.

Luster, measured only in Examples 1–5, was tested with a wound card that was not exposed to UV radiation.

In each of the following Examples 1–6, the first of the two tables indicates the proportions of polypropylene resin, halogenated phosphate ester flame retardant, hindered amine light stabilizer, and UV light absorber included in the formulations, in addition to the previously indicated components. For Examples 1–5, the second table summarizes the results of the flame retardancy, light stability, and luster tests, for the formulations listed in the first table; as stated above luster is not measured in Example 6.

Particularly as to the Vertical Burn Test, because, as indicated, the fabrics for Examples 1–5 were in the 6 to 10 oz./yd.$^2$ weight range, the pass/fail criteria were as follows:

After Flame—2 seconds maximum
Average Char Length—4.5 inches maximum

Correspondingly, because the Example 6 fabrics had weights of 10 to 12 oz./yd.$^2$, the pass/fail criteria therefor were as follows:

After Flame—2 seconds maximum
Average Char length—3.5 inches maximum

EXAMPLE 1

In this Example, Tinuvin 123, an alkoxyamine functional hindered amine light stabilizer of the invention, is the sole light stabilizer employed.

| Formulation | Weight Percent Polypropylene Resin (Himont P128) | Weight Percent Brominated Phosphate Ester (PB-370) | Weight Percent Hindered Amine Light Stabilizer HALS (Tinuvin 123) | Weight Percent UV Absorber (Tinuvin 234) |
|---|---|---|---|---|
| A | 99.3 | 0.0 | 0.0 | 0.0 |
| B | 94.3 | 5.0 | 0.0 | 0.0 |
| C | 98.3 | 0.0 | 1.0 | 0.0 |
| D | 96.3 | 0.0 | 1.0 | 2.0 |
| E | 96.3 | 0.0 | 3.0 | 0.0 |
| F | 94.3 | 0.0 | 3.0 | 2.0 |
| G | 96.3 | 2.0 | 1.0 | 0.0 |
| H | 93.3 | 5.0 | 1.0 | 0.0 |
| I | 91.3 | 5.0 | 1.0 | 2.0 |
| J | 91.3 | 5.0 | 3.0 | 0.0 |
| K | 89.3 | 5.0 | 3.0 | 2.0 |

| Formulation | FMVSS 302 Burn Rate (in/min) | Vertical Burn | Tenacity Retention (% or Original) | Luster (ΔL) |
|---|---|---|---|---|
| A | 2.48 | Fail | <30 (Too weak to test) | 3.9 |
| B | Self-Extinguishing | Pass | <30 (Too weak to test) | 3.3 |
| C | 1.57 | Fail | 70 | 5.2 |
| D | 0.87 | Fail | 86 | 3.9 |
| E | 0.78 | Fail | 89 | 5.3 |
| F | Self-Extinguishing | Fail | 97 | 4.2 |
| G | Self-Extinguishing | Pass | 64 | 3.8 |
| H | Self-Extinguishing | Pass | 64 | 4.0 |
| I | Self-Extinguishing | Pass | 85 | 3.4 |
| J | Self-Extinguishing | Pass | 50 | 2.4 |
| K | Self-Extinguishing | Pass | 87 | 3.1 |

The foregoing data demonstrate the deficiencies of those fibers and fabrics not of the invention. For those formulations without the alkoxyamine functional hindered amine light stabilizer (A, B), the fibers possessed little resistance to UV light degradation, as evidenced by the tenacity retention values for these materials.

Regarding the formulations lacking halogenated hydrocarbyl phosphate ester flame retardant (A, C, D, E, F), the fabrics failed the Vertical Burn Test, in each instance. As to the FMVSS 203 test method, the results were either failing, or only minimally satisfactory, for all save Formulation F (it is not known why the Formulation F fabrics were "self-extinguishing", and this result appears to be an anomaly).

In contrast, for the formulations of the invention—incorporating both the halogenated hydrocarbyl phosphate ester flame retardant and the alkoxyamine functional hindered amine light stabilizer (G, H, I, J, K)—the fibers and fabrics demonstrated invariably excellent flame retardancy as well as at least acceptable resistance to UV light degradation, without suffering delustering. This last feature—i.e., pertaining to surface luster—is evidenced by a comparison of the ΔL values for the fibers of Formulations C–F, on the one hand, and H–K, on the other.

Each of Formulations C–F corresponds to Formulations H–K, respectively, as to the proportion of stabilizer and absorber; however, the former formulations have no flame retardant, while each of the latter comprises 5 percent by weight, of the brominated phosphate ester. Accordingly, Formulations C and H both have 1 percent of the stabilizer and no absorber, but the former has the flame retardant, which the latter lacks; this pattern is repeated for Formulations D–F and I–K, accordingly providing Formulation pairings of D and I, E and J, and F and K.

For each such pair, the fibers of the formulation including the hydrocarbyl halogenated phosphate ester flame retardant do indeed have a lower ΔL value—and therefore, a lesser luster—than the fibers of the formulation without this component. However, the loss is generally minimal, and even where the difference is greatest—i.e., with Formulations E and J—the ΔL distinction between 5.2 and 2.4 represents only about a 50 percent loss, and, accordingly, does not rise to the level of delustering, occurring in the prior art.

EXAMPLE 2

In this Example also, the only light stabilizer employed is Tinuvin 123, the previously indicated alkoxyamine functional hindered amine light stabilizer of the invention.

| Formulation | Weight Percent Polypropylene Resin (Himont P128) | Weight Percent Brominated Phosphate Ester (PB-370) | Weight Percent Hindered Amine Light Stabilizer HALS (Tinuvin 123) | Weight Percent UV Absorber (Tinuvin 234) |
|---|---|---|---|---|
| A | 98.3 | 0.0 | 1.0 | 0.0 |
| B | 96.3 | 0.0 | 1.0 | 2.0 |
| C | 96.3 | 0.0 | 3.0 | 0.0 |
| D | 94.3 | 0.0 | 3.0 | 2.0 |
| E | 94.3 | 2.0 | 1.0 | 2.0 |
| F | 94.3 | 2.0 | 3.0 | 0.0 |
| G | 92.3 | 2.0 | 3.0 | 2.0 |
| H | 93.3 | 5.0 | 1.0 | 2.0 |
| I | 91.3 | 5.0 | 1.0 | 2.0 |
| J | 91.3 | 5.0 | 3.0 | 0.0 |
| K | 89.3 | 5.0 | 3.0 | 2.0 |

| Formulation | FMVSS 302 Burn Rate (in/min) | Vertical Burn | Tenacity Retention (% or Original) | Luster (ΔL) |
|---|---|---|---|---|
| A | 1.42 | Fail | 81 | 4.1 |
| B | 0.73 | Fail | 84 | 3.1 |
| C | 1.74 | Fail | 97 | 4.3 |
| D | 2.21 | Fail | 98 | 2.8 |
| E | Self-Extinguishing | Pass | 94 | 2.8 |
| F | Self-Extinguishing | Pass | 95 | 3.7 |
| G | Self-Extinguishing | Pass | 92 | 3.3 |
| H | Self-Extinguishing | Pass | 69 | 2.8 |
| I | Self-Extinguishing | Pass | 77 | 2.1 |
| J | Self-Extinguishing | Pass | 84 | 3.4 |
| K | Self-Extinguishing | Pass | 96 | 2.4 |

Here also, for the formulations without the flame retardant (A,B,C,D), the fabrics did not pass the Vertical Burn Test, and, as to the FMVSS 302 test method, either failed, or provided only minimally satisfactory results. However, for the formulations of the invention (E,F,G,H,I,J,K), incorporating both brominated phosphate ester flame retardant and alkoxyamine functional hindered amine light stabilizer, the fabrics and fibers exhibited excellent flame retardancy, and at least acceptable—and generally good to excellent—resistance to UV light degradation; also, as with the Example 1 formulations, besides the fabrics and fibers of the invention being characterized by these advantageous properties, the fibers did not undergo delustering.

Whereas for Example 1, the comparison with regard to luster is made between two groups of formulations, here, three such groups are employed, these being B–D, E–G, and I-K. Consistent with the previous situation, the first, second and third formulations in each group again have the same proportion of stabilizer and absorber, but differ in the amount of flame retardant, in that the amount of this latter component progressively increases, from group to group.

Accordingly, for instance, the three Formulations B, E, and I of Example 2, while all comprising 1 percent of the stabilizer and 2 percent of the absorber, have none, 2 percent, and 5 percent of the retardant, respectively. This pattern is repeated, with the two groupings corresponding to B, E, and I being C, F, and J as one such grouping, and D, G, and K as the other grouping.

Corresponding to results obtained in Example 1, the ΔL value does decrease, from formulation to formulation within each of the immediately foregoing three groupings, as the amount of flame retardant of the invention increases. However, again as with Example 1, the loss is generally minimal, and does not rise to the level of the delustering which occurs in the prior art.

| Formulation | P128) | 370) | (Tinuvin 123) | 234) |
|---|---|---|---|---|
| A | 96.3 | 0.0 | 1.0 | 2.0 |
| B | 94.3 | 2.0 | 1.0 | 1.0 |

| Formulation | FMVSS 302 Burn Rate (in/min) | Vertical Burn | Tenacity Retention (% or Original) | Luster (ΔL) |
|---|---|---|---|---|
| A | 0.85 | Fail | 96 | 3.1 |
| B | Self-Extinguishing | Pass | 100 | 2.8 |

Consistent with the previous Examples, with Formulation A lacking the halogenated hydrocarbyl phosphate ester flame retardant, the corresponding fabric failed the Vertical Burn Test, and gave only minimally satisfactory results in the FMVSS 302 test method. However, for Formulation B—the corresponding formulation of the invention, incorporating the halogenated hydrocarbyl phosphate ester flame retardant, as well as the alkoxyamine functional hindered amine light stabilizer—the fabric and fibers exhibited both excellent flame retardancy and excellent resistance to UV light degradation, and delustering did not occur.

EXAMPLE 4

For this Example, various hindered amine light stabilizers were employed in the different formulations. None of the formulations employing any of Chimassorb 944, Chimassorb 119, or Good-Rite 3150 includes alkoxyamine functional hindered amine light stabilizer; accordingly, these formulations are not provided with light stabilizer of the invention. In Formulation F, which is the sole formulation of the invention in this Example, alkoxyamine functional hindered amine alone comprises the light stabilizer component.

| Formulation | Weight Percent Polypropylene Resin (Himont P128) | Weight Percent Brominated Phosphate Ester (PB-370) | Weight Percent Hindered Amine Light Stabilizer HALS | | | | Weight Percent UV Absorber (AM-340) |
|---|---|---|---|---|---|---|---|
| | | | Chimassorb 944 | Chimassorb 119 | Tinuvin 123 | Goodrite 3150 | |
| A | 98.3 | 0.0 | 1.0 | 0.0 | 0.0 | 0.0 | 0.0 |
| B | 98.3 | 0.0 | 0.0 | 1.0 | 0.0 | 0.0 | 0.0 |
| C | 98.3 | 0.0 | 0.0 | 0.0 | 1.0 | 0.0 | 0.0 |
| D | 96.3 | 2.0 | 1.0 | 0.0 | 0.0 | 0.0 | 0.0 |
| E | 96.3 | 2.0 | 0.0 | 1.0 | 0.0 | 0.0 | 0.0 |
| F | 96.3 | 2.0 | 0.0 | 0.0 | 1.0 | 0.0 | 0.0 |
| G | 98.3 | 0.0 | 0.0 | 0.0 | 0.0 | 0.5 | 0.5 |
| H | 96.3 | 2.0 | 0.0 | 0.0 | 0.0 | 0.5 | 0.5 |

| Formulation | FMVSS 302 Burn Rate (in/min) | Vertical Burn | Tenacity Retention (% of Original) | Luster (ΔL) |
|---|---|---|---|---|
| A | 2.12 | Fail | 74 | 3.3 |
| B | 2.41 | Fail | 75 | 3.4 |
| C | 2.23 | Fail | 96 | 3.6 |
| D | 0.71 | Fail | 41 | 2.9 |
| E | Self-Extinguishing | Fail | 40 | 2.8 |
| F | Self-Extinguishing | Pass | 27 | 3.1 |
| G | Self-Extinguishing | Fail | 79 | 4.7 |
| H | Self-Extinguishing | Pass | 47 | 4.0 |

For the formulations lacking the halogenated hydrocarbyl flame retardant (A, B, C, and G), the results were consistent with those of the previous Examples—the fabrics failed both the Vertical Burn Test and Test Method FMVSS 302 (as occurred in Example 1, here also there is an anomaly, in that Formulation G tested at "self-extinguishing", though lacking the indicated flame

EXAMPLE 3

| Weight Percent Polypropylene Resin (Himont | Weight Percent Brominated Phosphate Ester (PB- | Weight Percent Hindered Amine Light Stabilizer HALS | Weight Percent UV Absorber (Tinuvin | retardant—again, the reason for this result is not known). For the formulation of the invention (F), incorporating both halogenated hydrocarbyl phosphate ester flame retardant, and alkoxyamine functional hindered amine light stabilizer, the fabric and fibers demonstrated excellent flame retardancy and resistance to UV light degradation, and did not undergo delustering.

EXAMPLE 5

All the formulations herein include both the halogenated hydrocarbyl phosphate ester flame retardant and the alkoxyamine functional hindered amine light stabilizer, and the products prepared therefrom are fibers and fabrics of the invention. As earlier noted, for this Example, finer fibers—i.e., of 2.5 dpf—were prepared, rather than the 10 dpf fibers of Examples 1–4.

| Formulation | Weight Percent Polypropylene Resin (Himont P128) | Weight Percent Brominated Phosphate Ester (PB-370) | Percent Hindered Amine Light Stabilizer HALS (Tinuvin 123) | Weight Percent UV Absorber (Tinuvin 234) |
|---|---|---|---|---|
| A | 93.3 | 5.0 | 1.0 | 0.0 |
| B | 89.3 | 5.0 | 3.0 | 2.0 |
| C | 91.3 | 5.0 | 3.0 | 0.0 |
| D | 94.3 | 2.0 | 1.0 | 2.0 |
| E | 96.3 | 2.0 | 1.0 | 0.0 |
| F | 92.3 | 2.0 | 3.0 | 2.0 |
| G | 94.3 | 2.0 | 3.0 | 0.0 |

| Formulation | FMVSS 302 Burn Rate (in/min) | Vertical Burn | Tenacity Retention (% or Original) | Luster (ΔL) |
|---|---|---|---|---|
| A | Self-Extinguishing | Pass | 55 | 4.5 |
| B | Self-Extinguishing | Pass | 89 | 2.7 |
| C | Self-Extinguishing | Pass | 88 | 3.7 |
| D | Self-Extinguishing | Pass | 85 | 2.5 |
| E | Self-Extinguishing | Pass | 80 | 4.3 |
| F | Self-Extinguishing | Pass | 96 | 2.2 |
| G | Self-Extinguishing | Pass | 72 | 3.8 |

Consistent with the fabrics and fibers of the invention in the previous Examples, here also, the fabrics and fibers are characterized by excellent flame retardancy, at least acceptable—and generally excellent—light stability, and lack of delustering.

EXAMPLE 6

This Example includes formulations of the invention wherein the light stabilizer is alkoxyamine functional hindered amine alone (Formulation B), or in combination with additional hindered amine (Formulations C, D, E, and J).

| Formulation | Weight Percent Polypropylene Resin (Himont P128) | Weight Percent Brominated Phosphate Ester (PB-370) | Weight Percent Hindered Amine Light Stabilizer HALS | | |
|---|---|---|---|---|---|
| | | | Tinuvin 622 | Chimassorb 119 | Tinuvin 123 |
| A | 93.3 | 3.0 | 1.0 | 0.0 | 0.0 |
| B | 93.3 | 3.0 | 0.0 | 0.0 | 1.0 |
| C | 93.3 | 3.0 | 0.3 | 0.0 | 0.7 |
| D | 93.3 | 3.0 | 0.5 | 0.0 | 0.5 |
| E | 93.3 | 3.0 | 0.7 | 0.0 | 0.3 |
| F | 92.9 | 3.0 | 1.0 | 0.5 | 0.0 |
| G | 93.3 | 3.0 | 0.5 | 0.5 | 0.0 |
| H | 93.1 | 3.0 | 0.7 | 0.5 | 0.0 |
| I | 92.8 | 3.0 | 1.5 | 0.0 | 0.0 |
| J | 92.8 | 3.0 | 1.0 | 0.0 | 0.5 |
| K | 96.5 | 0.0 | 1.0 | 0.0 | 0.0 |

| Formulation | Vertical Burn | Tenacity Retention (% of Original) |
|---|---|---|
| A | Fail | 43 |
| B | Pass | 73 |
| C | Pass | 82 |
| D | Pass | 80 |
| E | Pass | 70 |
| F | Fail | 67 |
| G | Fail | 41 |
| H | Fail | 54 |
| I | Fail | 48 |
| J | Pass | 92 |
| K | Fail | 36 |

As can be seen for Formulation K, 6.7 dtex (6 dpf) pigmented fibers lacking flame retardant fail the Vertical Burn Test. For finer deniers, such as 6.7 dtex, resistance to fiber degradation and to flame propagation is harder to obtain, because of the increase in the number of fibers per fabric surface area.

However, even where they are provided in such fine denier, the fibers of the invention exhibit good flame retardancy, as well as good resistance to UV degradation. Such favorable results are achieved both where the stabilizer is alkoxyamine functional amine alone (Formulation B), or in combination with additional hindered amine (Formulations C, D, E, and J).

The foregoing data demonstrate that, just as where the light stabilizer of the invention is alkoxyamine functional hindered amine alone, the use of other hindered amine light stabilizer, in combination therewith, likewise provides good results in the invention. The data further demonstrate that stabilizer combinations may be varied, to tailor formulations of the invention according to various factors—e.g., changes in fiber denier (dtex), fabric application requirements, and cost considerations.

Finally, although the invention has been described with reference to particular means, materials, and embodiments, it should be noted that the invention is not limited to the particulars disclosed, and extends to all equivalents within the scope of the claims.

What is claimed is:

1. A composition comprising:
   (a) at least one polyolefin;
   (b) at least one flame retardant, comprising a tris(halohydrocarbyl phosphate or phosphonate ester; and
   (c) at least one light stabilizer, comprising an alkoxyamine functional hindered amine.

2. The composition of claim 1, wherein the at least one polyolefin comprises a polypropylene.

3. The composition of claim 2, wherein the at least one polyolefin further comprises a polyethylene.

4. The composition of claim 1, wherein the at least one polyolefin comprises an ethylene-propylene copolymer.

5. The composition of claim 1, wherein the tris(halohydrocarbyl) phosphate or phosphonate ester comprises a tris(haloaliphatic) phosphate or phosphonate ester without a hydrogenated carbon, in a position alpha to a halogen bearing carbon.

6. The composition of claim 5, wherein the tris(haloaliphatic) phosphate or phosphonate ester comprises a member selected from the group consisting of tris(3-bromo-2,2 bis(bromomethyl)propyl) phosphate, tris(trichloroneopentyl)phosphate, tris(chlorodibromoneopentyl)phosphate, and tris(bromodichloroneopentyl)phosphate.

7. The composition of claim 1, wherein the tris(halohydrocarbyl) phosphate or phosphonate ester comprises a tris(haloaromatic) phosphate or phosphonate ester.

8. The composition of claim 7, wherein the tris(haloaromatic) phosphate or phosphonate ester comprises a member selected from the group consisting of tris(2,4-dibromophenyl) phosphate, tris(2,4-dichlorophenyl) phosphate, and tris(2,4,6-tribromophenyl) phosphate.

9. The composition of claim 1, wherein the at least one light stabilizer further comprises a nonalkoxyamine functional hindered amine, the alkoxyamine functional hindered amine, and the nonalkoxyamine functional hindered amine, being present in relative proportions such that, after exposure to 200 hours of carbon arc radiation, under the conditions set forth in AATCC Test Method 16A-1990 or in ASTM G23-90, the composition has a tenacity retention of at least 50 percent.

10. The composition of claim 9, wherein the weight ratio, of the alkoxyamine functional hindered amine to the nonalkoxyamine functional hindered amine, is from about 1:5 to about 5:1.

11. The composition of claim 9, wherein the nonalkoxyamine functional hindered amine comprises at least one member selected from the group consisting of polymethyl propyl 3-oxy-[4(2,2,6,6-tetramethyl)piperidinyl] siloxane,

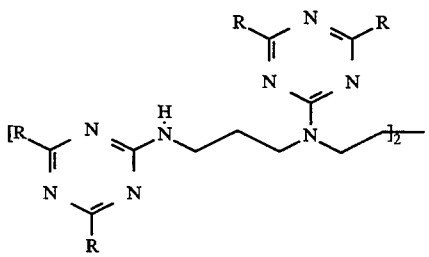

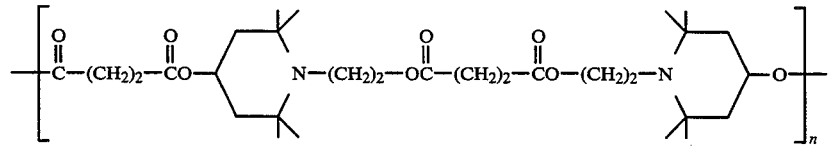

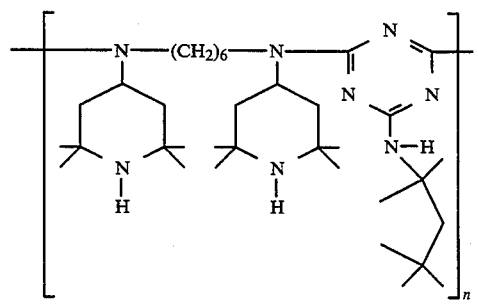

having a number average molecular weight ($M_n$) of at least about 2500, and

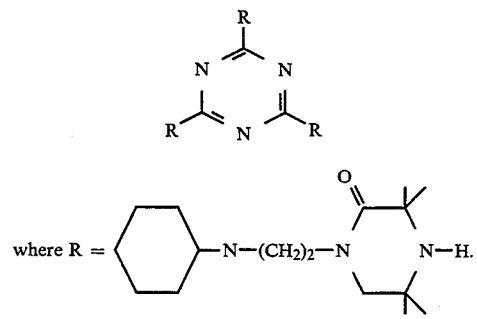

12. The composition of claim 1, wherein the tris(halohydrocarbyl) phosphate or phosphonate ester comprises from about 0.5 to about 15 percent by weight of the composition.

13. The composition of claim 1, wherein the alkoxyamine functional hindered amine comprises

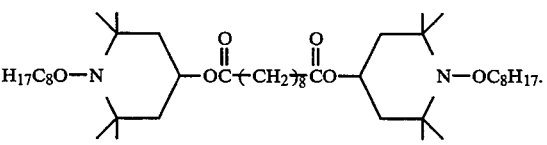

14. The composition of claim 1, wherein the at least one light stabilizer comprises from about 0.01 to about 3 percent by weight of the composition.

15. The composition of claim 1, further comprising at least one UV light absorber.

16. The composition of claim 15, wherein the at least one UV light absorber comprises a member selected from the group consisting of 2-3', 5'-bis(1-methyl-1-phenylethyl)-2'-hydroxyphenyl) benzotriazole and 2,4-di-tert-butylphenyl 3,5-di-tert-butyl-4-hydroxybenzoate.

17. The composition of claim 15, wherein the at least one UV light absorber comprises from about 0.01 to about 3 percent by weight of the composition.

18. A fiber comprising:

(a) at least one polyolefin;
(b) at least one flame retardant, comprising a tris(-halohydrocarbyl) phosphate or phosphonate ester flame retardant; and
(c) at least one light stabilizer, comprising an alkoxyamine functional hindered amine.

19. The fiber of claim 18, wherein the at least one polyolefin comprises a polypropylene.

20. The fiber of claim 19, wherein the at least one polyolefin further comprises a polyethylene.

21. The fiber of claim 18, wherein the at least one polyolefin comprises an ethylene-propylene copolymer.

22. The fiber of claim 18, wherein the tris(halohydrocarbyl) phosphate or phosphonate ester comprises a tris(haloaliphatic phosphate or phosphonate ester without a hydrogenated carbon, in a position alpha to a halogen bearing carbon.

23. The fiber of claim 22, wherein the tris(haloaliphatic) phosphate or phosphonate ester comprises a member selected from the group consisting of tris(3-bromo-2,2bis(bromomethyl)propyl) phosphate, tris(trichloroneopentyl)phosphate, tris(chlorodibromoneopentyl)phosphate, and tris(bromodichloroneopentyl)phosphate.

24. The fiber of claim 18, wherein the tris(halohydrocarbyl)phosphate or phosphonate ester comprises a tris(haloaromatic)phosphate or phosphonate ester.

25. The fiber of claim 24, wherein the tris(-haloaromatic)phosphate or phosphonate ester comprises a member selected from the group consisting of tris(2,4-dibromophenyl)phosphate, tris(2,4-dichlorophenyl)phosphate, and tris(2,4,6-tribromophenyl) phosphate.

26. The fiber of claim 18, wherein the at least one light stabilizer further comprises a nonalkoxyamine functional hindered amine, the alkoxyamine functional hindered amine, and the nonalkoxyamine functional hindered amine, being present in relative proportions such that, after exposure to 200 hours of carbon arc radiation, under the conditions set forth in AATCC Test Method 16A-1990 or in ASTM G23-90, the fiber has a tenacity retention of at least 50 percent.

27. The fiber of claim 26, wherein the weight ratio, of the alkoxyamine functional hindered amine to the nonalkoxyamine functional hindered amine, is from about 1:5 to about 5:1.

28. The fiber of claim 26, wherein the nonalkoxyamine functional hindered amine comprises at least one member selected from the group consisting of polymethyl propyl 3-oxy-[4(2,2,6,6-tetramethyl)piperidinyl] siloxane,

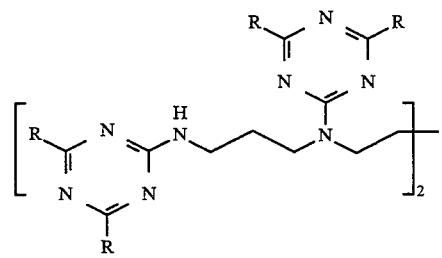

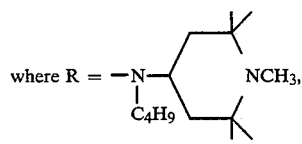

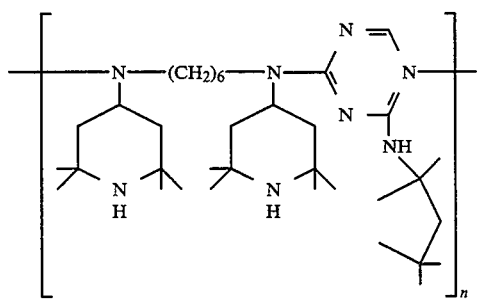

having a number average molecular weight ($M_n$) of at least about 2500, and

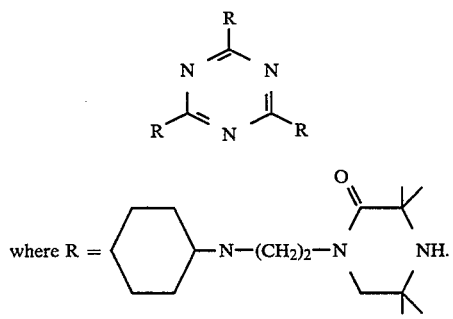

29. The fiber of claim 18, wherein the tris(-halohydocarbyl)phosphate or phosphonate ester comprises from about 0.5 to about 15 percent by weight of the composition.

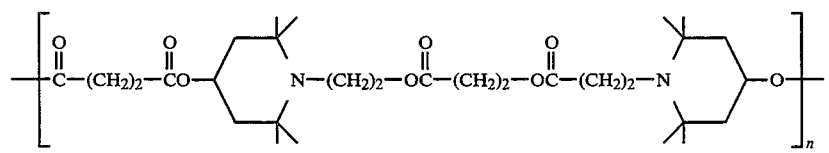

having a number average molecular weight ($M_n$) of at least about 2500,

30. The fiber of claim 18, wherein the alkoxyamine functional hindered amine comprises

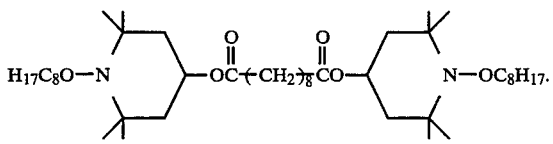

31. The fiber of claim 18, wherein the at least one light stabilizer comprises from about 0.01 to about 3 percent by weight of the composition.

32. The fiber of claim 18, further comprising at least one UV light absorber.

33. The fiber of claim 32, wherein the at least one UV light absorber comprises a member selected from the group consisting of 2-3',5'-bis(1-methyl-1-phenylethyl)-2'-hydroxyphenyl) benzotriazole and 2,4-di-tert-butylphenyl 3,5-di-tert-butyl-4-hydroxybenzoate.

34. The fiber of claim 32, wherein the at least one UV light absorber comprises from about 0.01 to about 3 percent by weight of the composition.

35. A textile structure comprising a plurality of fibers, the fibers comprising:
(a) at least one polyolefin;
(b) at least one flame retardant, comprising a tris(halohydrocarbyl)phosphate or phosphonate ester; and
(c) at least one light stabilizer, comprising an alkoxyamine functional hindered amine.

36. The textile structure of claim 35, wherein the at least one polyolefin comprises a polypropylene.

37. The textile structure of claim 36, wherein the at least one polyolefin further comprises a polyethylene.

38. The textile structure of claim 35, wherein the at least one polyolefin comprises an ethylene-propylene copolymer.

39. The textile structure of claim 35, wherein the tris(halohydrocarbyl)phosphate or phosphonate ester comprises a tris(haloaliphatic)phosphate or phosphonate ester without a hydrogenated carbon, in a position alpha to a halogen bearing carbon.

40. The textile structure of claim 39, wherein the tris(haloaliphatic)phosphate or phosphonate ester comprises a member selected from the group consisting of tris(3-bromo-2,2 bis(bromomethyl)propyl) phosphate, tris(trichloroneopentyl)phosphate, tris(chlorodibromoneopentyl)phosphate, and tris(bromodichloroneopentyl)phosphate.

41. The textile structure of claim 35, wherein the tris(halohydrocarbyl)phosphate or phosphonate ester flame retardant comprises a tris(haloaromatic)phosphate or phosphonate ester.

42. The textile structure of claim 41, wherein the tris(haloaromatic)phosphate or phosphonate ester comprises a member selected from the group consisting of tris(2,4-dibromophenyl) phosphate, tris(2,4-dichlorophenyl) phosphate, and tris(2,4,6-tribromophenyl) phosphate.

43. The textile structure of claim 35, wherein the at least one light stabilizer further comprises a nonalkoxyamine functional hindered amine, the alkoxyamine functional hindered amine, and the nonalkoxyamine functional hindered amine, being present in relative proportions such that, after exposure to 200 hours of carbon arc radiation, under the conditions set forth in AATCC Test Method 16A-1990 or in ASTM G23-90, the textile structure has a tenacity retention of at least 50 percent.

44. The textile structure of claim 43, wherein the weight ratio, of the alkoxyamine functional hindered amine to the nonalkoxyamine functional hindered amine, is from about 1:5 to about 5:1.

45. The textile structure of claim 43, wherein the nonalkoxyamine functional hindered amine comprises at least one member selected from the group consisting of polymethyl propyl 3-oxy-[4(2,2,6,6-tetramethyl)-piperidinyl] siloxane,

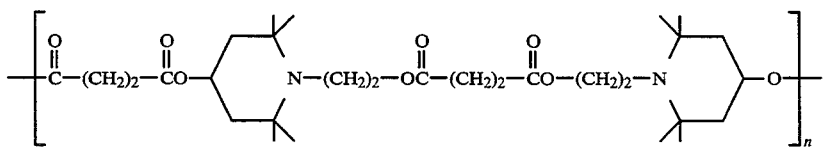

having a number average molecular weight (M$_n$) of at least about 2500,

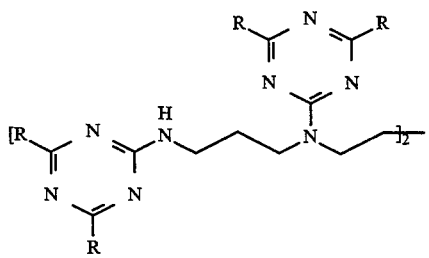

where R = 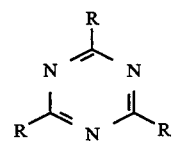 N.CH$_3$,

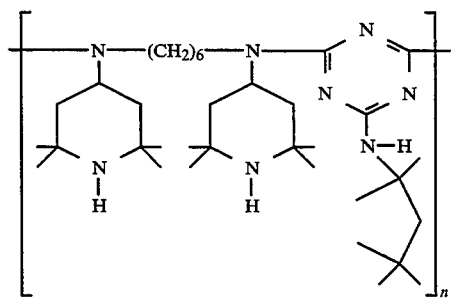

having a number average molecular weight (M$_n$) of at least about 2500, and where R = 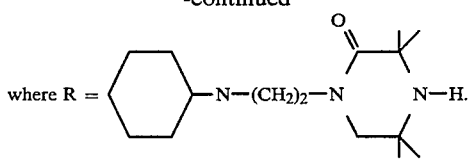

46. The textile structure of claim 35, wherein the tris(halohydrocarbyl) phosphate or phosphonate ester comprises from about 0.5 to about 15 percent by weight of the composition.

47. The textile structure of claim 35, wherein the alkoxyamine functional hindered amine comprises

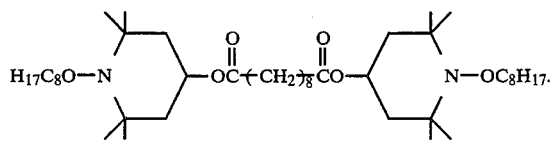

48. The textile structure of claim 35, wherein the at least one light stabilizer comprises from about 0.01 to about 3 percent by weight of the composition.

49. The textile structure of claim 35, further comprising at least one UV light absorber.

50. The textile structure of claim 49, wherein the at least one UV light absorber comprises a member selected from the group consisting of 2-3',5'-bis(1-methyl-1-phenylethyl)-2'-hydroxyphenyl) benzotriazole and 2,4-di-tert-butylphenyl 3,5-di-tert-butyl-4-hydroxybenzoate.

51. The textile structure of claim 49, wherein the at least one UV light absorber comprises from about 0.01 to about 3 percent by weight of the composition.

52. A method of preparing a fiber comprising:
at least one polyolefin;
at least one flame retardant, comprising a tris(halohydrocarbyl) phosphate or phosphonate ester; and
at least one light stabilizer, comprising an alkoxyamine functional hindered amine;
the method comprising an extrusion step, of extruding a mixture of the at least one polyolefin, the at least one flame retardant, and the at least one light stabilizer, to obtain a filament.

53. The method of claim 52, wherein the at least one polyolefin comprises a polypropylene.

54. The method of claim 53, wherein the at least one polyolefin further comprises a polyethylene.

55. The method of claim 52, wherein the at least one polyolefin comprises an ethylene-propylene copolymer.

56. The method of claim 52, wherein the tris(halohydrocarbyl) phosphate or phosphonate ester comprises from about 0.5 to about 15 percent by weight of the mixture.

57. The method of claim 52, wherein the at least one light stabilizer comprises from about 0.01 to about 3 percent by weight of the mixture.

58. The method of claim 52, further comprising a mixing step, of dry-mixing the at least one polyolefin, the at least one flame retardant, and the at least one light stabilizer, prior to the extrusion step.

59. The method of claim 52, further comprising a cutting step, of cutting the filament.

60. The method of claim 59, further comprising a texturing step, of texturing the filament, prior to the cutting step.

61. The method of claim 59, further comprising drawing the filament, to a fineness of from about 2 to about 25 dpf, prior to the cutting step.

62. The method of claim 52, wherein the tris(halohydrocarbyl) phosphate or phosphonate ester comprises a member selected from the group consisting of tris(3-bromo-2,2 bis(bromomethyl)propyl) phosphate, tris(trichloroneopentyl)phosphate, tris(chlorodibromoneopentyl)phosphate, tris(bromodichloroneopentyl)phosphate, tris(2,4-dibromophenyl)phosphate, tris(2,4-dichlorophenyl)phosphate, and tris(2,4,6-tribromophenyl) phosphate.

63. The method of claim 52, wherein the at least one light stabilizer further comprises a nonalkoxyamine functional hindered amine, the nonalkoxyamine functional hindered amine comprising at least one member selected from the group consisting of polymethyl propyl 3-oxy-[4(2,2,6,6-tetramethyl)piperidinyl] siloxane,

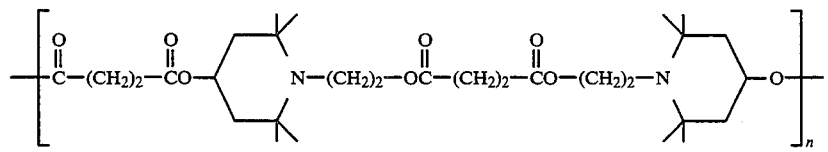

having a number average molecular weight ($M_n$) of at least about 2500,

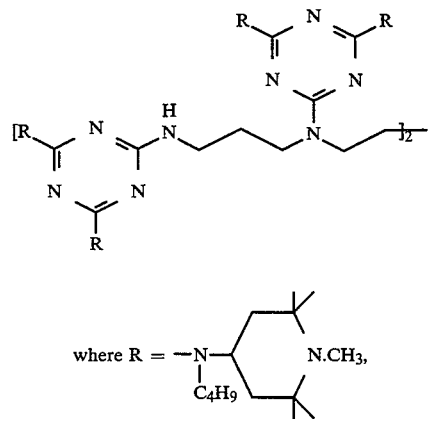

where R = 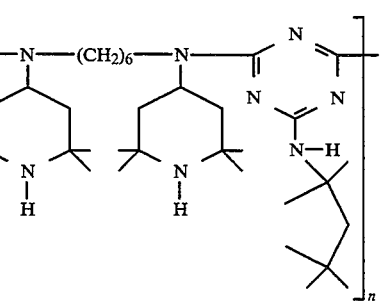

having a number average molecular weight ($M_n$) of at least about 2500, and

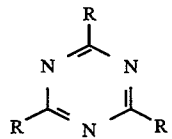

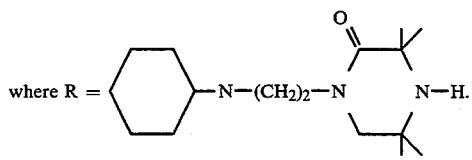

the alkoxyamine functional hindered amine, and the nonalkoxyamine functional hindered amine, being present in relative proportion such that, after exposure to 200 hours of carbon arc radiation, under the conditions set forth in AATCC Test Method 16A-1990 or in ASTM G23-90, the fiber has a tenacity retention of at least 50 percent.

64. The method of claim 52, wherein the mixture further comprises at least one UV light absorber.

65. The method of claim 64, wherein the at least one UV light absorber comprises from about 0.01 to about 3 percent by weight of the mixture.

66. The fiber of claim 18 wherein the ΔL luster of the fiber is greater than about 2.

67. The method of claim 52 wherein the ΔL luster of the fiber is greater than about 2.

68. The textile structure of claim 35 wherein the ΔL luster of the fibers is greater than about 2.

* * * * *

UNITED STATES PATENT AND TRADEMARK OFFICE
CERTIFICATE OF CORRECTION

PATENT NO. : 5,393,812
DATED : February 28, 1995
INVENTOR(S) : Charla S. Haley and William L. Sanchez It is certified that error appears in the above-indentified patent and that said Letters Patent is hereby corrected as shown below:

Col. 24, lines 48 and 49, "tris(halo-hydrocarbyl" should read --tris(halohydrocarbyl)--.

Signed and Sealed this

Second Day of May, 1995

*Attest:*

BRUCE LEHMAN

*Attesting Officer*    *Commissioner of Patents and Trademarks*